(12) United States Patent
Joshi et al.

(10) Patent No.: US 8,532,927 B2
(45) Date of Patent: Sep. 10, 2013

(54) GENERATING PHOTOGENIC ROUTES FROM STARTING TO DESTINATION LOCATIONS

(75) Inventors: Dhiraj Joshi, Rochester, NY (US); Jiebo Luo, Pittsford, NY (US); Jie Yu, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 792 days.

(21) Appl. No.: 12/266,863

(22) Filed: Nov. 7, 2008

(65) Prior Publication Data

US 2010/0121566 A1    May 13, 2010

(51) Int. Cl.
*G01C 21/00* (2006.01)

(52) U.S. Cl.
USPC ........... 701/537; 701/400; 701/401; 701/468; 701/533

(58) Field of Classification Search
USPC ................. 701/201, 209, 211, 400, 410, 468, 701/533, 537
See application file for complete search history.

(56) References Cited

U.S. PATENT DOCUMENTS

| | | | |
|---|---|---|---|
| 6,199,014 B1 * | 3/2001 | Walker et al. | 701/428 |
| 6,865,483 B1 * | 3/2005 | Cook et al. | 340/995.14 |
| 7,151,996 B2 * | 12/2006 | Stein | 701/400 |
| 7,386,392 B1 | 6/2008 | Kabel et al. | |
| 7,474,959 B2 * | 1/2009 | Singh | 701/420 |
| 7,653,485 B2 * | 1/2010 | Fujita et al. | 701/411 |
| 2006/0129312 A1 * | 6/2006 | Chou et al. | 701/201 |
| 2007/0032942 A1 * | 2/2007 | Thota | 701/200 |
| 2008/0004797 A1 | 1/2008 | Katzer | |
| 2008/0319640 A1 * | 12/2008 | Fujita et al. | 701/200 |
| 2009/0048773 A1 * | 2/2009 | Jarventie et al. | 701/201 |
| 2009/0198442 A1 * | 8/2009 | Takagi | 701/201 |
| 2010/0292917 A1 * | 11/2010 | Emam et al. | 701/201 |

OTHER PUBLICATIONS

A.J. Smola and B. Scholkopf, "A Tutorial on Support Vector Regression," Statistics and Computing, Sep. 30, 2003, pp. 1-24.
D. Joshi and J. Luo, "Inferring Generic Activities and Events From Image Content and Bags of Geo-Tags" Proceedings of the International Conference on Image and Video Retrieval, Jun. 25, 2008, pp. 37-46.
J. Luo et al., "Event Recognition—Viewing the World with a Third Eye," Proceedings of ACM International Conference on Multimedia, MM Oct. 2008, pp. 1071-1080.
R. Datta et al., "Studying Aesthetics in Photographic Images Using a Computational Approach" Proceedings of European Conference on Computer Vision, 2006, pp. 288-301.
Yanagawa et al., Columbia University's Baseline Detectors for 374 LSCOM Semantic Visual Concepts, Columbia University ADVENT Technical Report #222-2006-8, Mar. 20, 2007, pp. 1-17.

* cited by examiner

*Primary Examiner* — Prasad Gokhale

(57) ABSTRACT

A method of computing at least one photogenic route from a starting location to a destination location, including; computing photogenic values for images in a large collection representing a geographic region that includes the starting location and the destination location; computing a photogenic index for each route segment based on computed photogenic values of images taken along the route segment; computing at least one photogenic route from the starting location to the destination location and presenting the route(s) to a user.

20 Claims, 9 Drawing Sheets

SCENE CATEGORIES — 20

1. CITIES
2. HISTORICAL SITES
3. SPORTS VENUES
4. MOUNTAINS
5. BEACHES/OCEANS
6. PARKS
7. LOCAL CUISINE

PHOTOGENIC VALUE CATEGORIES — 22

1. UNINTERESTING
2. UNSATISFACTORY
3. SATISFACTORY
4. FAIR
5. GOOD
6. EXCELLENT
7. OUTSTANDING

*FIG. 4*

GENERATING PHOTOGENIC ROUTES FROM STARTING TO DESTINATION LOCATIONS

FIELD OF THE INVENTION

The present invention relates to computing at least one photogenic route from a starting location to a destination location.

BACKGROUND OF THE INVENTION

GPS devices have revolutionized the art and science of vehicle navigation. Besides providing navigational services, GPS units store information about recreational places, parks, restaurants, airports etc. which are useful to make travel decisions on the fly. On most occasions, the fastest or shortest route is the most sought after by users. Kabel et.al. in U.S. Pat. No. 7,386,392 B1 have described systems, devices, and methods for calculating a course for avoiding user identified criteria. A navigation device with route calculation capabilities includes a processor connected to an input and a memory that includes cartographic data and user identified criteria. A route calculation algorithm can be used to calculate a course between two or more waypoints based on the predefined user criteria of the cartographic data. Performing the route calculation algorithm includes analyzing the cartographic data with a preference for providing the course that identifies and avoids the user identified criteria. A display is connected to the processor and is capable of displaying the calculated route and cartographic data. The device is also adapted to dynamically analyze an area surrounding a present location for user identified criteria to avoid and display the results of the analysis.

Most known algorithms for determining routes typically draw upon digitalized map data, which exhibit digital forms of individual road segments. The algorithms for determining a route combine the road segments based on various criteria. In a simplest case, the shortest segment-based route is searched for, i.e., the road segments yielding the shortest route to be traveled are selected. Alternatively, algorithms oriented toward the expected time for traveling such a route are today commonly used in determining an optimal route. A route comprised of varying road segments is here selected based on the expected traveling time, and a route having the shortest expected time is computed. In modern navigation devices, a user can introduce preset options, in which the road segments to be considered for a route must also satisfy various presettable criteria. For example, current navigation systems can often make use of a stipulation that the route be picked without taking into account ferry connections or toll roads. Taken together, these stipulations yield the fastest possible trip or least expensive trip.

It may be desirable to automatically generate routes that incorporate other aspects, in particular have a high recreational value. In US Patent Application US2008/0004797 A1, Katzer describes a method for the automatic, computer-assisted determination of a route travelable by motor vehicles from a starting point to a destination point based on digitalized map data, wherein a computer acquires a starting point and destination point, and determines the route based on possible road segments, is expanded in such a way that the automatically generated routes have a high recreational value. To this end, it is proposed that the computer determining the route preferably incorporate those road segments into the route that exhibit a high number of curves. Curves are road segments in which the road follows curves. Curves with a narrower, i.e., smaller radius are preferred in US Patent Application US2008/0004797 A1. Curvy roads are often preferred in particular by those drivers who do not determine the route just based on getting from one location to another as fast or inexpensively as possible, but emphasize the pleasure of driving. This holds true especially for drivers of motorcycles, sports cars or cabriolets, since traveling on curvy roads imparts a sporty driving experience precisely in these motor vehicles, thereby incorporating an "entertainment" or "recreational value". One way of automatically determining the curvy road segments is described and illustrated in US Patent Application US2008/0004797 A1. The focus is placed in particular on the curve radius as well, so that only those road segments are designated as having "a high number of curves" that have corresponding curves with small radii. In the final analysis, the desired driving feel depends on the experienced transverse accelerations that are simulated in the method described here, taking into account the circular radii and expected speeds. The greater the transverse accelerations, the more fun the drive, so that a minimum level is here selected for these transverse accelerations, serving as a minimum threshold for defining a road segment as "exhibiting a high number of curves" or "curvy". Routes with a high recreational value can also essentially be compiled based on other criteria, e.g., the selection of road segments that are scenic, panoramic, or interesting from the standpoint of archaeological history or architecture. Comparable designations can already be found in classic maps, in which scenic roads can be marked green, for example.

What is essentially missing in the aforementioned inventions is that the panoramic or scenic value of routes is assessed based on legacy historical data gathered from maps, travel books, tourist guides and the likes. Today, there are millions of user contributed images available on the Web and a sizable (and increasing) number of them are associated with geographical information (geotags). This volume of user contributed data can be leveraged to generate "photogenic routes" from a source to destination. These routes take a traveler through the more "photographed routes" or routes which are likely to provide a traveler with opportunities to enjoy beautiful sceneries/locales and/or take high quality pictures.

The present invention relates to general navigation and in particular generating and suggesting photogenic route(s) from a starting location to a destination location using a GPS device, quality and content of images taken a priori along all possible routes from the starting location to the destination location. The invention also displays the distribution of scene categories that travelers are likely to encounter in these photogenic route(s). In the current invention, scene categories will refer to high level concept or scene classes which are commonly represented in pictures taken by people.

SUMMARY OF THE INVENTION

In accordance with the present invention, there is provided a method of computing at least one photogenic route from a starting location to a destination location, comprising;
    a) computing photogenic values for images in a large collection representing a geographic region that includes the starting location and the destination location;
    b) computing a photogenic index for each route segment based on computed photogenic values of images taken along the route segment;
    c) computing at least one photogenic route from the starting location to the destination location and presenting the route(s) to a user.

Features and advantages of the present invention include providing desirable photogenic routes to a user based on input starting and destination locations. Further the user can provide information which can facilitate the selection of these photogenic routes.

BRIEF DESCRIPTION OF THE DRAWINGS

FIG. 4 is a list of scene categories and photogenic value categories that will be used to practice an embodiment of the current invention;

DETAILED DESCRIPTION OF THE INVENTION

Figure 1:
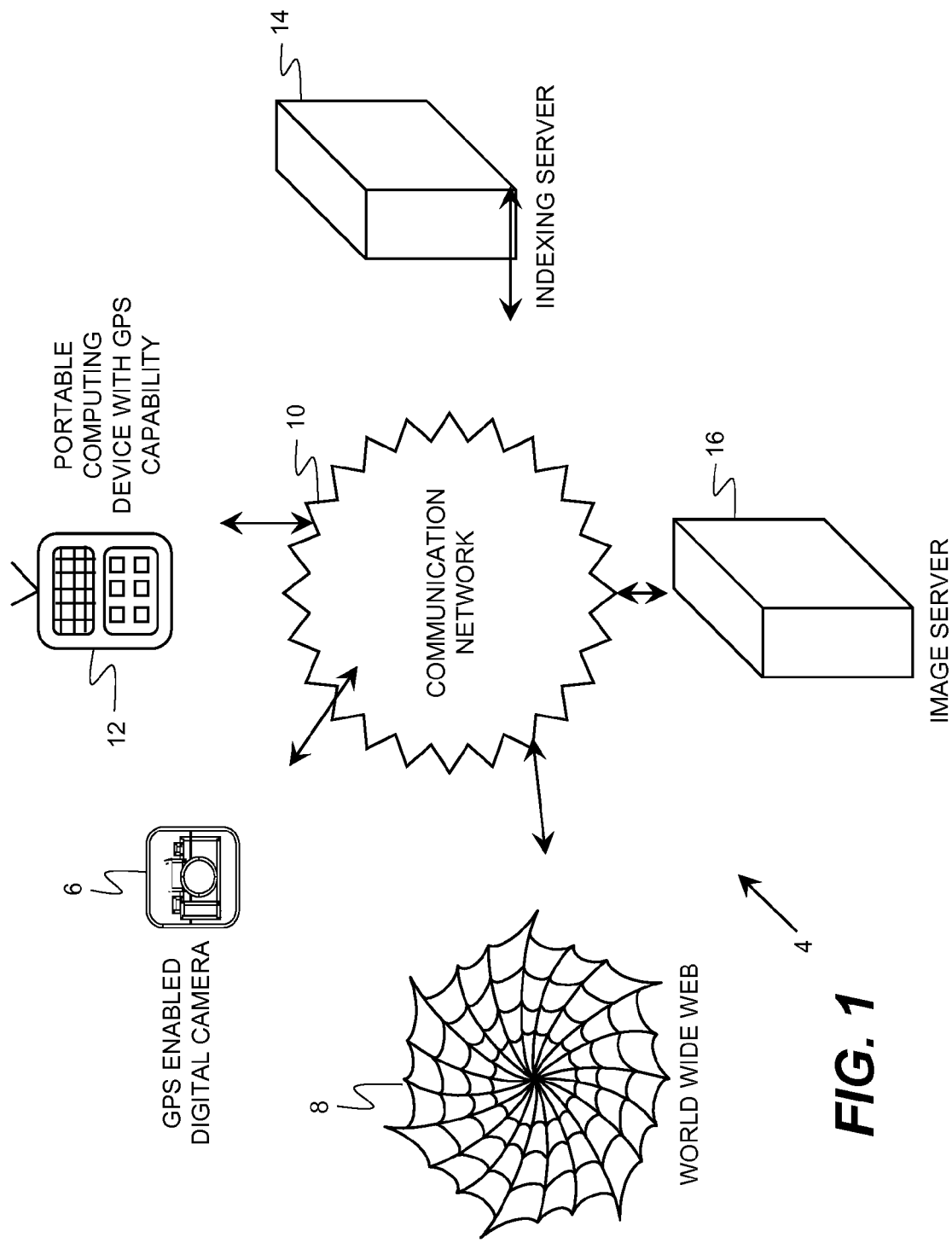
FIG. 1 is a pictorial of a system that will be used to practice an embodiment of the current invention.

In FIG. 1, a system 4 is shown with the elements necessary to practice the current invention including a GPS enabled digital camera 6, a portable computing device 12, an indexing server 14, an image server 16, a communications network 10, and the World Wide Web 8. Computing device 12 can be an online trip advisor, an offline trip advisor, or a GPS navigation device. It is assumed that computing device 12 is capable of performing shortest/fastest route computations as are most standard handheld devices and also capable of transferring and storing images, text, and maps and displaying these for the users. In the current invention, images will be understood to include both still and moving or video images. It is also understood that images used in the current invention have GPS information. Computing device 12 can communicate through communications network 10 with the indexing server 14, the image server 16 and the World Wide Web 8. Computing device 12 is capable of requesting from indexing and image servers (14 and 16) all the information required to calculate route costs and store it locally. Computing device 12 can from time to time request for updated information from servers 14 and 16.

Indexing server 14 is another computer processing device available on communications network 10 for the purpose of executing the algorithms in the form of computer instructions. Indexing server 14 is capable of executing algorithms that analyze the content of images for semantic information such as scene category types and algorithms that compute the photogenic value of images. Indexing server 14 also stores results of algorithms executed in flat files or in a database. Indexing server 14 periodically receives updates from image server 16 and if necessary performs re-computation and re-indexing. It will be understood that providing this functionality in the communication network 10 as a web service via indexing server 14 is not a limitation of the invention.

Image server 16 communicates with the World Wide Web 8 and other computing devices via the communications network 10 and upon request, image server 16 provides image(s) photographed in the provided position information to portable computing device 12 for the purpose of display. Images stored on image server 16 can be acquired in a variety of ways. Image server 16 is capable of running algorithms as computer instructions to acquire images and their associated meta-data from the World Wide Web 8 through the communication network 10. GPS enabled digital camera devices 6 can also transfer images and associated meta-data to image server 16 via the communication network 10.

Figure 2:
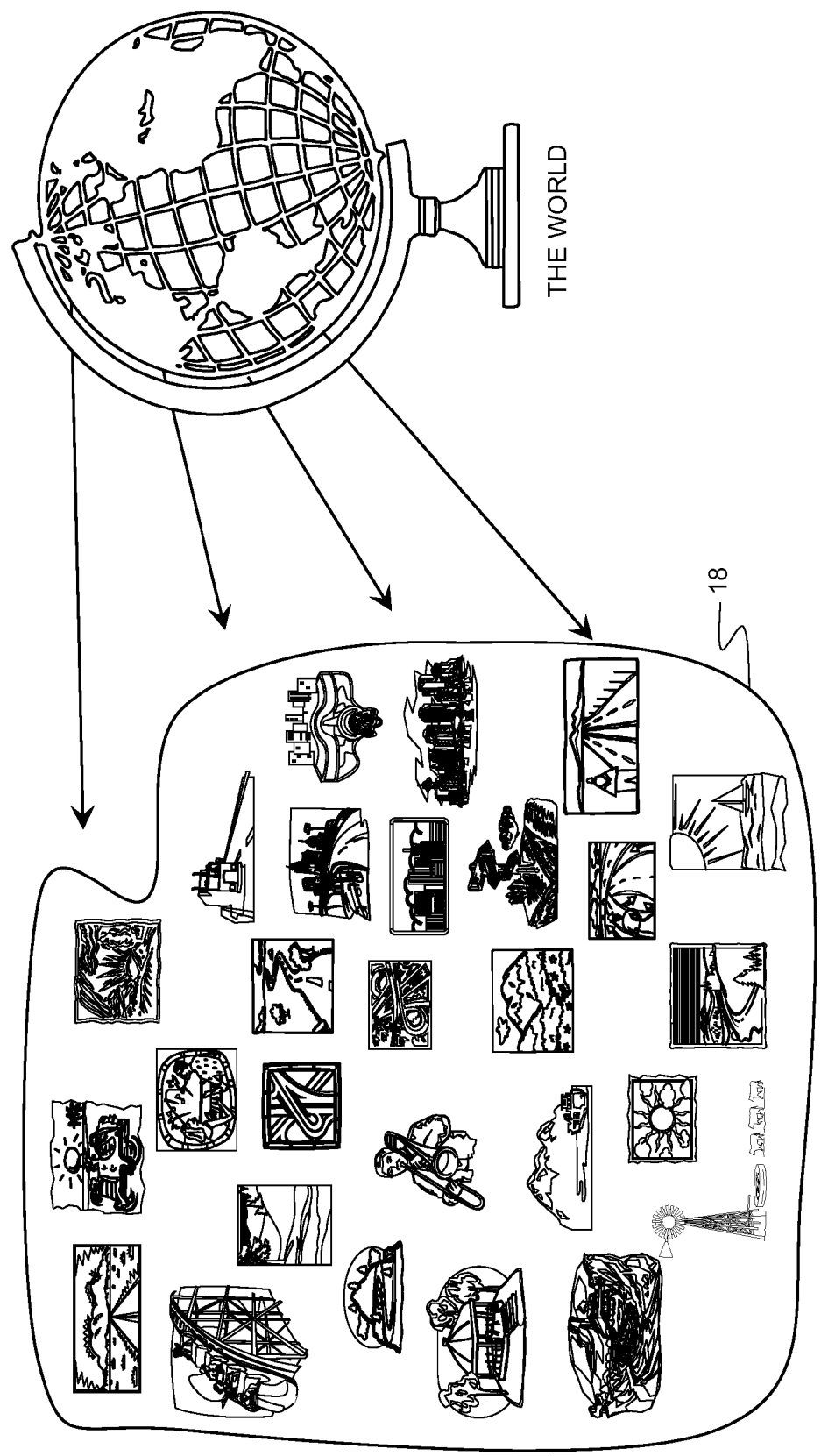
FIG. 2 illustrates the current scenario where images taken in a plurality of locations representing plurality of scene categories and having different photogenic values are used in a preferred embodiment of the current invention.

FIG. 2 shows digital images (as clip art collection 18) which can potentially come from many different geographic regions from all over the world. These images can represent many different scene categories and could have diverse photogenic values. Images used in a preferred embodiment of the current invention will be obtained from certain selected image sharing Websites (such as Yahoo! Flickr), which allow storing of geographical meta-data with images and allow API to request for images and associated meta-data. Images can also be communicated via GPS enabled cameras 6 to image server 16. Quality control issues may arise when allowing individual people to upload their personal pictures in image server. However the current invention does not address this issue and it is assumed that only bona-fide users have access to the image server and direct user uploads can be trusted.

A fast-emerging trend in digital photography and community photo sharing is geo-tagging. The phenomenon of geo-tagging has generated a wave of geo-awareness in multimedia. Yahoo! Flickr has amassed about 3.2 million photos geo-tagged in the month this document is being written. Geo-tagging is the process of adding geographical identification meta-data to various media such as websites or images and is a form of geospatial meta-data. It can help users find a wide variety of location-specific information. For example, one can find images taken near a given location by entering latitude and longitude coordinates into a geo-tagging-enabled image search engine. Geo-tagging-enabled information services can also potentially be used to find location-based news, websites, or other resources. Photo-sharing sites such as Yahoo! Flickr have realized the need to tap into geographical information for search, sharing, and visualization of multimedia. Flickr now allows users to provide geo-location information for their pictures either as exact or approximate geographical coordinates with the help of a map interface or as geographically relevant keywords. Geo-tagging can also be performed by using a digital camera equipped with a GPS receiving sensor or by using a digital camera that can communicate with a standalone GPS receiver (e.g., through a Bluetooth link). Photos can also be synchronized with a GPS logging device.

Figure 3:
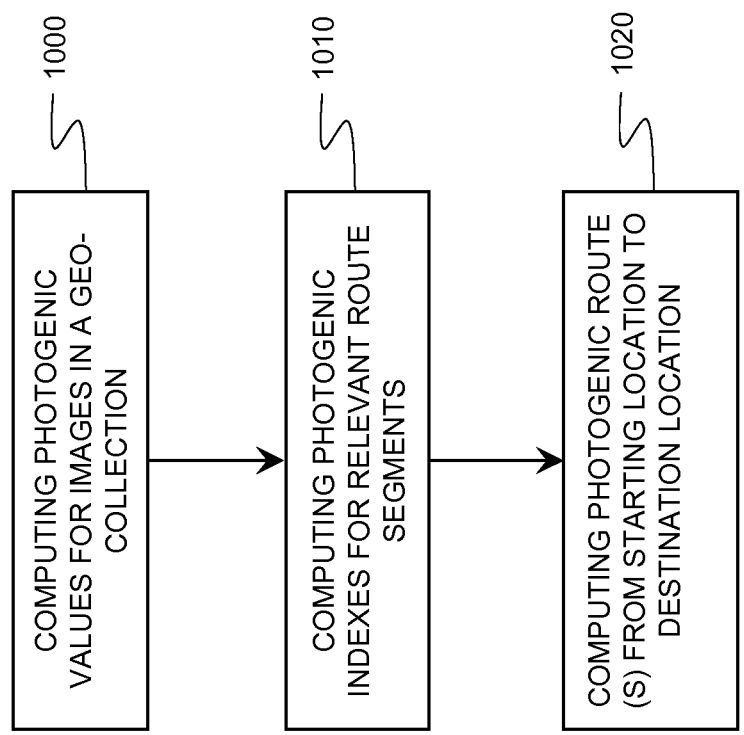
FIG. 3 is a flow chart showing steps required for practicing an embodiment of the current invention.
Figure 5:
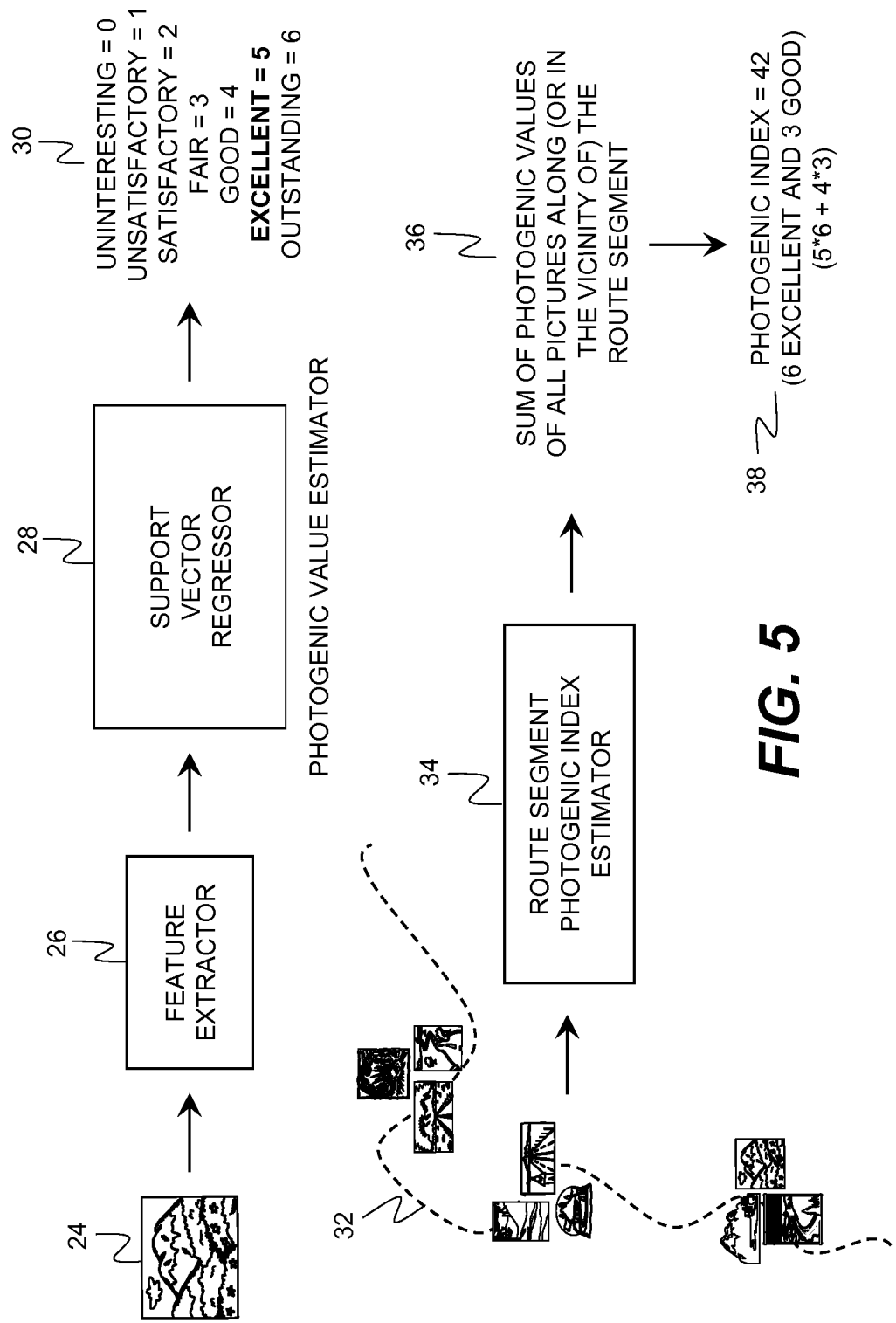
FIG. 5 shows examples of a photogenic value classifier and a route segment photogenic index estimator that will be used to practice an embodiment of the current invention.
Figure 6:
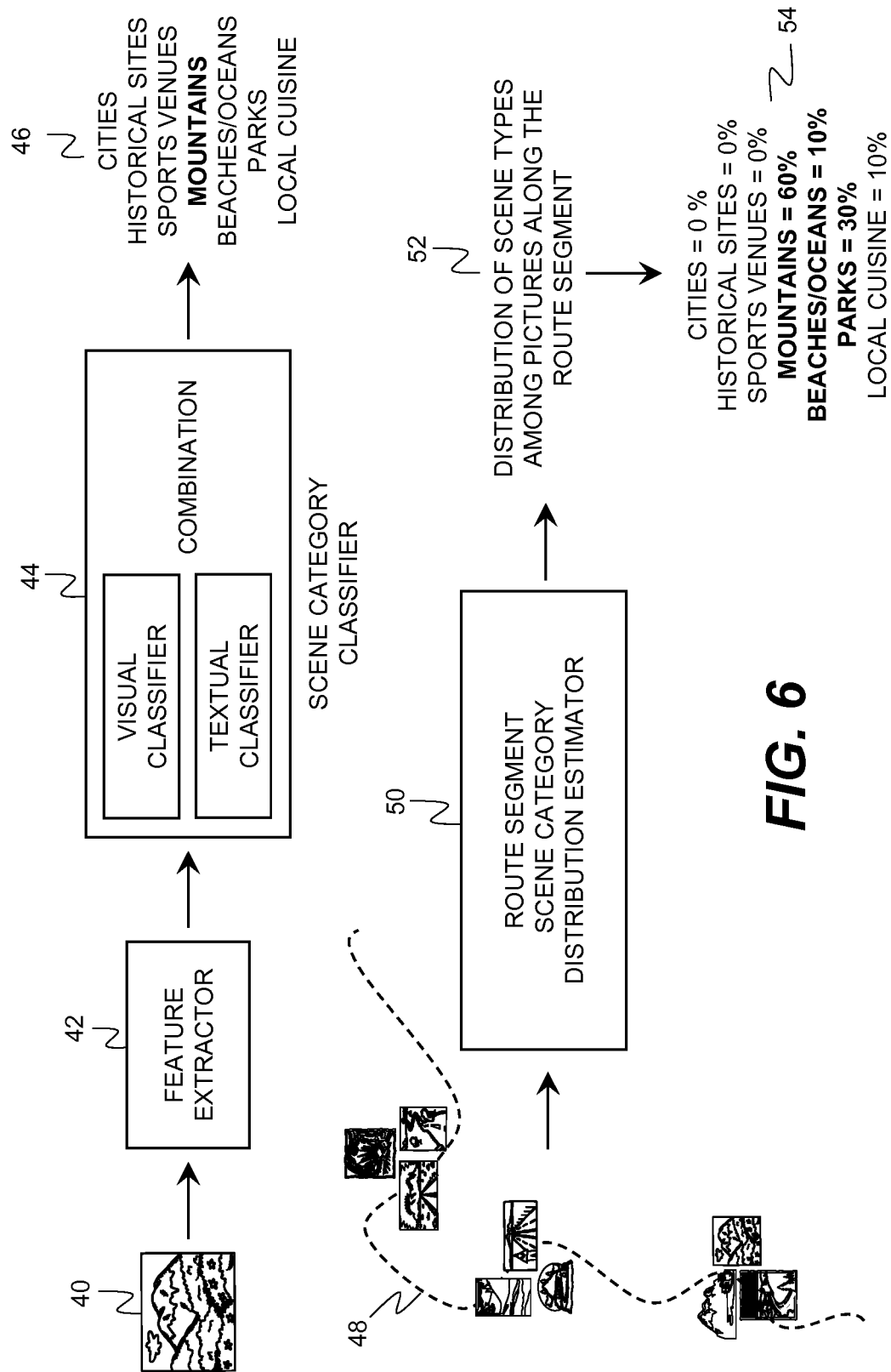
FIG. 6 shows examples of a scene category classifier and a route segment scene category distribution estimator that will be used to practice an embodiment of the current invention.

FIG. 3 shows the three major computation steps required in the current invention. Step 1000 is applied to images while steps 1010 and 1020 are applied to route segments. Details of the individual steps and examples are shown and discussed later. FIG. 4 is a list of scene categories 20 and photogenic value categories 22 that will be used to practice a preferred embodiment of the current invention. FIG. 5 shows examples of photogenic value estimation and route segment photogenic index estimation. FIG. 6 shows examples of scene category classification and route segment scene category distribution estimation.

Figure 7:
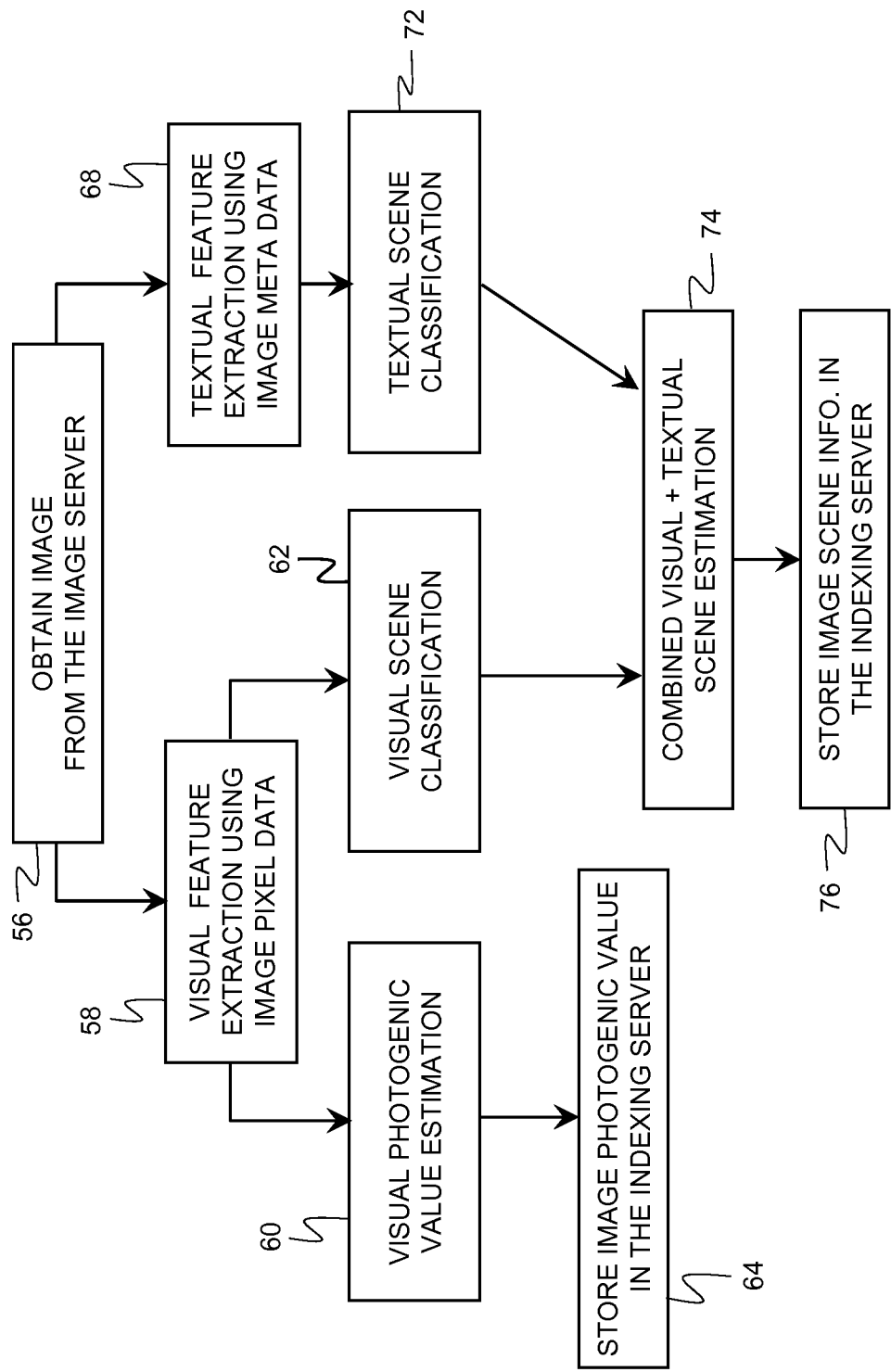
FIG. 7 is a flowchart for practicing an embodiment of the computation of photogenic values and scene categories for a large collection of images representing a geographic region that includes a starting location and a destination location.

FIG. 7 shows a stepwise breakup of the computation required to be performed on individual images in the current invention. This computation is performed in the indexing server 14. In step 56, an image is acquired from the image server 16. Along with the image, image meta-data, such as tags associated with the image and its GPS co-ordinates, is also obtained by the indexing server. At this stage, the computation on the image forks into two independent steps processing image pixel data (steps 58, 60, 62, and 64) and image meta-data (steps 68, and 72). The combination step (step 74) combines results from processing the two modalities (visual and textual) for the image.

Researchers in computer vision have attempted to model aesthetic value or quality of pictures based on their visual content. An example of such a research can be found in the published article of R. Datta, D. Joshi, J. Li, and J. Z. Wang, Studying Aesthetics in Photographic Images Using a Computational Approach, Proceedings of European Conference on Computer Vision, 2006. The approach presented in the aforementioned article classifies pictures into aesthetically high and aesthetically low classes based on color, texture, and shape based features which are extracted from the image. In the approach presented in the previous article, training images are identified for each of the "aesthetically high" and "aesthetically low" categories and a classifier is trained. At classification time, the classifier extracts color, texture, and shape based features from an image and classifies it into "aesthetically high" or "aesthetically low" class. The aforementioned article also presents aesthetics assignment as a linear regression problem where images are assigned a plurality of numeric aesthetic values instead of "aesthetically high and low" classes. Support vector machines have been widely used for regression. The published article of A. J. Smola and B. Schölkopf, A tutorial on support vector regression, Statistics and Computing, 2004 describes support vector regression in detail. In a preferred embodiment of the current invention, a support vector regression technique will be used to assign photogenic values from among the seven photogenic value categories shown as 22 in FIG. 4. The photogenic value categories shown as 22 in FIG. 4 are believed to be representative in assessing a wide range of photographs. However fixing this number to 7 categories is not a limitation of the current invention. The photogenic value category obtained for the input image is stored in the indexing server (step 64 in FIG. 7). FIG. 5 shows an example where an input image 24 passes through feature extraction 26 and support vector regression 28 steps to be assigned a photogenic value 30.

The published article of D. Joshi, and J. Luo, Inferring Generic Activities and Events using Visual Content and Bags of Geo-tags, Proceedings of Conference on Image and Video Retrieval, 2008 provides a method for classifying an image into a plurality of activity/event scene categories in a probabilistic framework leveraging image pixels and image meta-data. A preferred embodiment of the current invention employs the approach described in the aforementioned article for scene classification. Meta-data which is recorded with images in the form of text annotations (also called tags) or GPS information has been found to be very useful in image classification research. A useful technique to model text which comes with images is to use the bag-of-words approach. The bag-of-words model is a simplifying assumption used in natural language processing and information retrieval. In this model, a text (such as a sentence or a document) is represented as an unordered collection of words, disregarding grammar and even word order. The bag-of-words model has been used extensively in some methods of document classification. The aforementioned article leverages GPS information available with pictures and uses a geographic database to obtain location specific geo-tags which are then used for detection of activity/event scenes in pictures. The article leverages image pixel information using the state-of-the-art support vector machine (SVM) based event/activity scene classifiers described in the published article of A. Yanagawa, S.-F. Chang, L. Kennedy, and W. Hsu, Columbia University's Baseline Detectors for 374 LSCOM Semantic Visual Concepts, Columbia University ADVENT Technical Report #222-2006-8, 2007. These classifiers use image color, texture, and shape information for activity/event classification.

An important step in classification of images using more than one classifier is the combination or fusion of responses from multiple classifiers (in the current invention, visual and text based classifiers) (step 74 in FIG. 7). There has been significant research in fusion for multimedia classification and concept detection. Fusion can be conducted at three levels. Feature-level fusion requires concatenation of visual and text features to form a monolithic feature vector, which often leads to the curse-of-dimensionality problem when the training set is not sufficiently large. Decision-level fusion trains a fusion classifier that takes the prediction labels of different classifiers for multiple modalities. Score-level fusion often uses the output scores from multiple classifiers across all of the categories and feeds them to a fusion or meta-classifier. The classifier fusion method adopted in the published article of D. Joshi, and J. Luo, Inferring Generic Activities and Events using Visual Content and Bags of Geo-tags, Proceedings of ACM Conference on Image and Video Retrieval, 2008 uses a weighted average of scores from visual and textual classifiers to obtain a final score. While this is a simple and widely adopted fusion methodology, contextual reinforcement from classifiers built for a plurality of scene categories cannot be leveraged. A widely used score level fusion variant is one discussed in the published article of J. Luo, J, Yu, D. Joshi, and W. Hao, Event Recognition—Viewing the World with a Third Eye, Proceedings of ACM International Conference on Multimedia, 2008. The fusion step in the aforementioned article involves providing classification scores (from a plurality of scene category classifiers) to a meta-classifier (another support vector machine). This fusion meta-classifier is in turn built by putting aside a portion of training data for validation. A preferred embodiment of the current invention uses the described score-level fusion methodology. This fusion technique has certain advantages: (1) compared with the feature-level fusion, score-level fusion can take advantage of the loosely probabilistic output of different classifiers on multiple features and avoid the high dimensionality problem; (2) compared with the decision-level fusion, the confidence-rated scores provide more information than the predicted "hard" labels alone. The scene categories shown as 20 in FIG. 4 are believed to be representative of a wide range of photographs taken during travels. However fixing this number to 7 categories is not a limitation of the current invention. The scene category obtained for the input image is stored in the indexing server (step 76 in FIG. 7). FIG. 6 shows an example where an input image 40 passes through feature extraction 42, and scene category classification 44 steps to be assigned a scene category 46.

Figure 8:
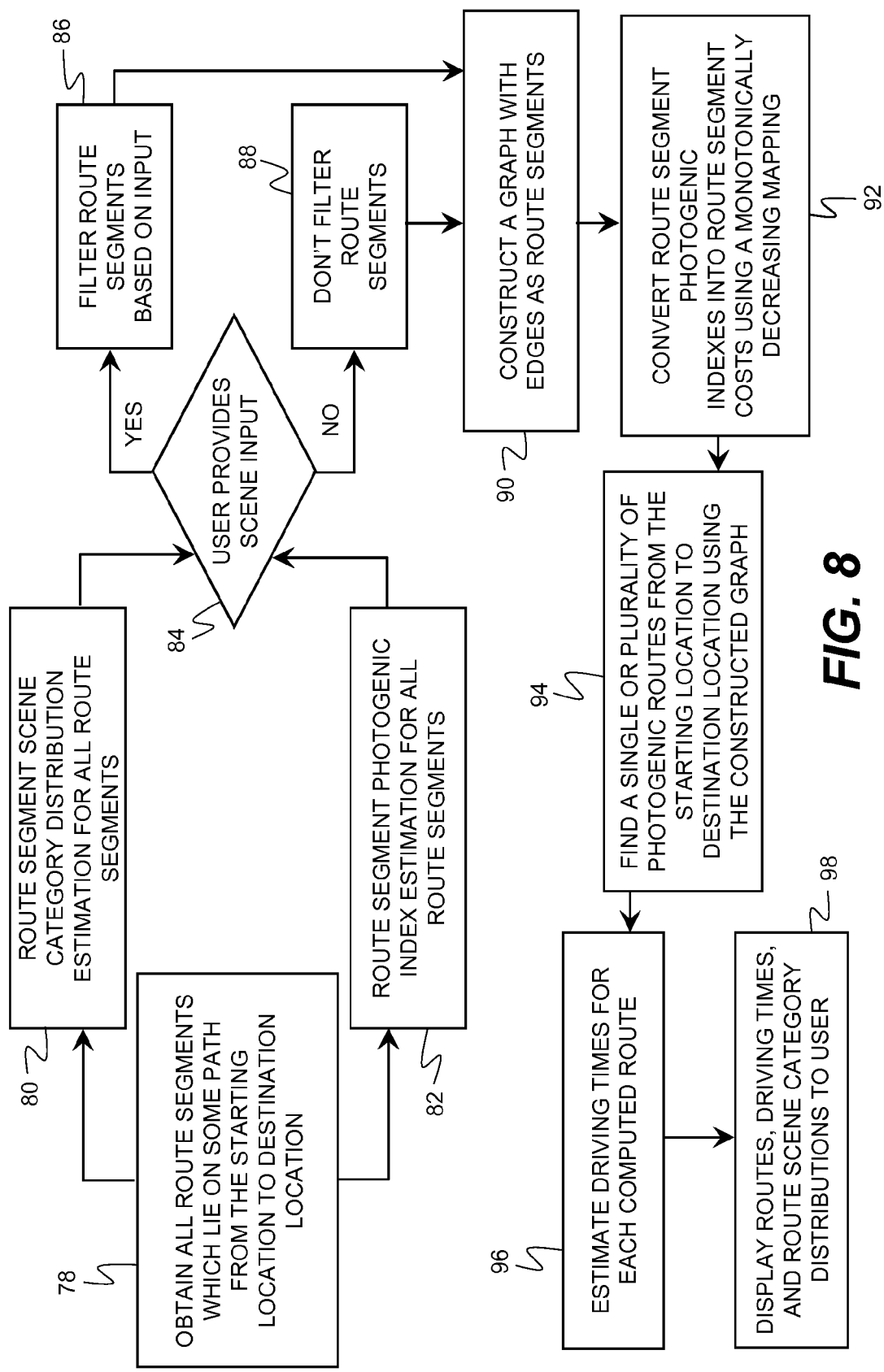
FIG. 8 is a flowchart for practicing an embodiment of the computation of one or plurality of photogenic routes from the starting location to the destination location.

FIG. 8 outlines the steps required for the computation of photogenic routes to be presented to the user. In an embodiment of the current invention, these computation steps are performed in the portable computing device 12. A prerequisite for computation of photogenic route(s) is the availability of navigation maps and route information in the mentioned device. In this regard, several information providers exist today who provide navigation maps and route information, an example being Navteq Corporation. In this invention, a route segment is defined as a motorable route according to any usable navigation maps and route information database. In FIG. 8, step 78 involves obtaining all route segments which lie on some navigable path from starting location to destination location. Step 78 is identical to the first step performed in any available GPS device today capable of computing shortest and (or) fastest route from a starting location to a destination location. Steps 80 (route segment scene category distribution estimation) and 82 (Route segment photogenic index estimation) in FIG. 8 (can be potentially performed in parallel) involve operations on the route segments obtained in step 78. These steps are illustrated and explained using examples in FIGS. 5 and 6.

FIG. 5 shows the photogenic index estimation step 34 performed on a route segment 32. Photogenic index of a route segment is defined as an aggregation of photogenic values of images taken along (or in the vicinity) of the route segment such that the photogenic index is high if images taken along (or in the vicinity) of the route segment have high photogenic values. In an embodiment of the current invention, this index can be computed as the sum of photogenic values of all pictures along (or in the vicinity of) the route segment (steps 36 and 38 in FIG. 5). Considering images which have geographical signatures in the vicinity of a route segment is essential for several reasons. Geographic signatures of pictures may not be strictly along the route segments. At times, people take exits to scenic spots, or simply get off the roads to take pictures. GPS coordinates recorded with pictures may also have a certain degree of error. In an embodiment of the current invention, vicinity of a route segment is defined as an elliptical area around the route segment, with the major axis being the straight line from start to end of route segment and the length of minor axis being a quarter of the major axis length. FIG. 6 shows the route segment scene-category distribution estimation step 50 performed on a route segment 48. In an embodiment of the current invention this distribution is estimated by computing the percentages of images classified into a plurality of scene categories such as shown in steps 52 and 54. Images taken in the vicinity (defined above) of the route segment are considered for this computation. This completes description (via examples) of steps 80 (route segment scene category distribution estimation) and 82 (route segment photogenic index estimation) on the route segments obtained in step 78.

In step 84, user may optionally provide an input. The input here could be choice(s) of scene category(ies) which the user likes. Another form of user input could be his/her picture collection from which user preferred categories can be automatically inferred. In an embodiment of the current invention, this inference will be based on distribution of scene categories obtained by classifying pictures from the provided user collection using scene category classifiers. Based on user input category(ies) and/or inferred category(ies), route segments may be filtered (step 86) by removing route segments which do not have a significant percentage of images classified into the user preferred category(ies). In an embodiment of the current invention, this percentage is fixed at 50%. If the user does not choose to provide input no route segments are filtered from further processing (step 88).

In step 90, a graph is constructed with edges as route segments (taken forward from step 86 or step 88). In step 92, route segment photogenic indexes are converted into route segment costs (or weights) for photogenic route calculation. In typical shortest and fastest route problems from starting location to destination location, edge costs (or weights) consist of edge distances and edge travel times respectively. For computation of photogenic route(s), edge costs should be some function of the photogenic indexes of edges (route segments). The function chosen here should be a monotonically decreasing function of the photogenic index of an edge (intuitively the more photogenic an edge is, the lower should be its cost in the graph). In a preferred embodiment of the current invention, the monotonically decreasing function $(f(x)=e^{-x^2/\sigma^2})$ is used to calculate the edge weight if x is the photogenic index of the edge. The constant σ is pre-calculated as the standard deviation of photogenic index values of a small sample (10%) of edges. Choice of some other appropriate monotonically decreasing function is not a limitation of the current invention. After this step computing photogenic route(s) becomes equivalent to computing shortest route(s) using route weights as obtained above.

In an embodiment of the current invention, the user may be presented with more than one photogenic route, the driving times of these routes, and the route scene category distributions. This is especially important because the user could have time constraints. Moreover, an ideal photogenic route calculator should allow space for subjectivity and user interest. An appropriate number (of routes) may be fixed or asked from the user. In an ideal embodiment of the current invention, a K-shortest path algorithm is used to estimate a plurality of photogenic routes (step 94) and their respective driving times (step 96). The published article of D. Eppstein, Finding the k shortest paths, SIAM Journal of Computing, 1998 describes a way of estimating a plurality of shortest routes from a starting location to destination location. In step 98, the computed photogenic route(s) are displayed to the user.

Figure 9:
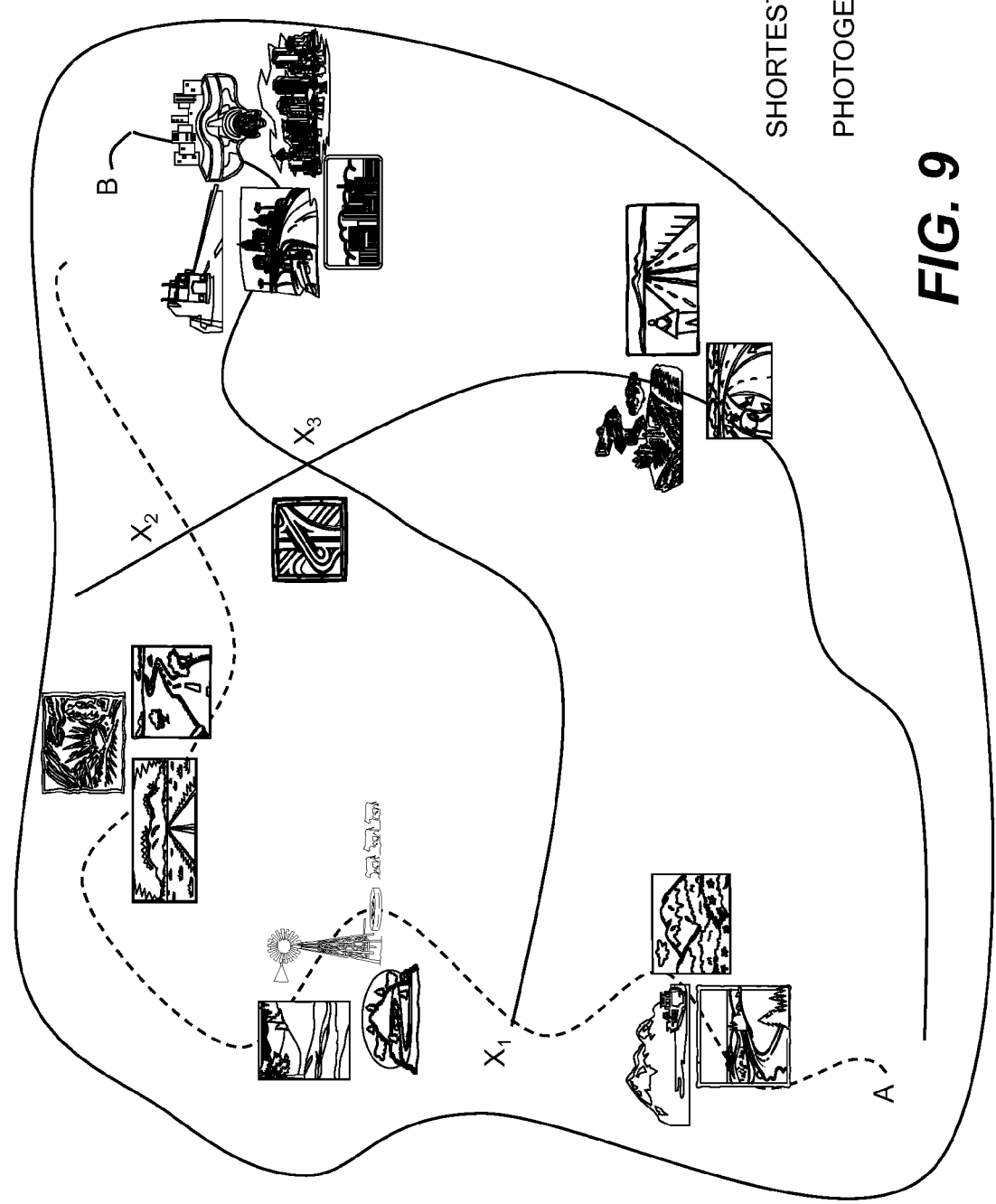
FIG. 9 is a schematic drawing to illustrate the difference between the shortest/fastest route and a photogenic route (obtained from applying an embodiment of the current invention) from the starting location to the destination location.

A schematic comparison of the photogenic route problem with the shortest (here also fastest) route problem is shown in FIG. 9. In the figure, the starting location is A and the destination location is B. Pictures taken are shown on or along the routes A-X1, X1-X2, X3, A-X3, and X3-B. The figure attempts to illustrate that pictures along route A-X1-X2 depict scenic mountains, snow, rivers, sunrise, and natural vegetation. Pictures taken along route A-X3 depict relatively uninteresting desert conditions, and road signs. The picture taken at point X3 shows a highway intersection while along the segment X3-B there are pictures of high-rise buildings and cityscapes. FIG. 9 illustrates a situation where a photogenic route (and not a shortest/fastest route) could be a preferred option for a user who has time at hand. By visual analysis, it is evident that for most travelers, route A-X1-X2-X3-B would present a more photogenic drive versus route A-X3-B.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

PARTS LIST

4 System with all elements necessary to practice invention
6 GPS enabled digital camera
8 World Wide Web
10 Communication Network 12 Portable computing device with GPS capability
14 Indexing Server
16 Image Server
18 Images from different geographic regions representing a variety of scene categories
20 Scene categories
22 Photogenic value categories
24 Input image
26 Feature extractor module
28 Support vector regressor
30 Photogenic value assignment
32 Input route segment
34 Route segment photogenic index estimator
36 Methodology for route segment photogenic index estimation
38 Photogenic index output
40 Input image
42 Feature extractor module
44 Scene category classifier
46 Scene category assignment
48 Input route segment
50 Route segment scene category distribution estimator
52 Methodology for route segment scene category distribution estimation
54 Route segment scene category distribution output
56 Image obtaining step
58 Visual feature extraction step
60 Visual photogenic value estimation step
62 Visual scene classification step
64 Image photogenic value storing step
68 Textual feature extraction step
72 Textual scene classification step
74 Combined visual and textual scene estimation step
76 Image scene information storing step
78 Step to obtain all route segments to be used for computation of photogenic route(s)
80 Route segment scene category distribution estimation step for all route segments obtained in step 78
82 Route segment photogenic index estimation step for all route segments obtained in step 78
84 User input step
86 Route segment filtering step based on input in step 84
88 Step alternate to step 86 where route segments are not filtered
90 Graph construction step
92 Conversion of route segment photogenic indexes into route segment costs
94 Photogenic route(s) computation step
96 Estimation of driving times for photogenic route(s)
98 Displaying route(s) and associated information to user
1000 Step involves computing photogenic values for images in a geo-collection
1010 Step involves computing photogenic indexes for relevant route segments
1020 Step involves computing photogenic route(s) from starting location to destination location

The invention claimed is:

1. A method comprising;
using a communication network to access diverse digital images stored on the Internet previously captured at a plurality of different times in a geographic region, wherein the geographic region includes a starting location and a destination location;
computing photogenic values for the accessed diverse images;
computing a photogenic index for each route segment based on the computed photogenic values of the accessed diverse images corresponding to the route segment; and
using the computed photogenic indexes to compute at least one preferred photogenic route from the starting location to the destination location and presenting the at least one preferred photogenic route on a user-device.

2. The method of claim 1, wherein a plurality of photogenic routes is presented to the user and the user selects the desired route from the plurality of photogenic routes.

3. The method of claim 1, wherein computing photogenic values includes using visual features extracted from images for computing their photogenic values.

4. The method of claim 1, wherein computing photogenic values includes using visual features extracted from images and textual features extracted from meta-data of images for computing their photogenic values.

5. The method of claim 1, wherein computing photogenic values includes assignment of the photogenic value from a plurality of categories including "uninteresting", "unsatisfactory", "satisfactory", "fair", "good", "excellent", and "outstanding".

6. The method of claim 1, wherein computing a photogenic index for each route segment includes aggregating photogenic values of images taken along a route segment to compute the photogenic index of the route segment.

7. The method of claim 6, further including aggregation of photogenic values of images taken in the vicinity of a route segment to compute the photogenic index of the route segment.

8. A device configured to compute at least one photogenic route having one or more segments from a starting location to a destination location, wherein computing the at least one photogenic route comprises:
using a communication network to access diverse digital images stored on the Internet previously captured by a plurality of dissociated devices— at a plurality of different times in a geographic region, wherein the geographic region includes the starting location and destination location;
computing photogenic values for the accessed diverse images;
computing a photogenic index for each route segment based on the computed photogenic values of the accessed diverse images corresponding to the route segment; and
using the computed photogenic indexes to compute at least one preferred photogenic route from the starting location to the destination location and presenting the at least one preferred photogenic route on a user-device.

9. The device of claim 8, wherein the device is an online trip advisor, an offline trip advisor, or a GPS navigation device.

10. A method comprising;
using a communication network to access diverse digital images stored on the Internet previously captured by a plurality of dissociated users—at a plurality of different times in a geographic region, wherein the geographic region includes a starting location and a destination location;
computing photogenic values for the accessed diverse images;
detecting scene categories for the accessed diverse images;
computing a photogenic index for each route segment based on the computed photogenic values of the accessed diverse images with respect to one or more of the scene categories corresponding to the route segment;

using the computed photogenic indexes to compute at least one preferred photogenic route from the starting location to the destination location and presenting the at least one preferred photogenic route and the corresponding route scene category distribution on a user-device.

11. The method of claim 10, wherein a plurality of photogenic routes is presented to the user and the user selects the desired route from the plurality of photogenic routes.

12. The method of claim 10, wherein computing photogenic values includes using visual features extracted from images for computing their photogenic values.

13. The method of claim 10, wherein computing photogenic values includes using visual features extracted from images and textual features extracted from meta-data of images for computing their photogenic values.

14. The method of claim 10, wherein computing photogenic values includes assignment of the photogenic value from a plurality of categories including "uninteresting", "unsatisfactory", "satisfactory", "fair", "good", "excellent", and "outstanding".

15. The method of claim 10, wherein computing a photogenic index for each route segment includes aggregating photogenic values of images taken along a route segment to compute the photogenic index of the route segment.

16. The method of claim 15, further including aggregation of photogenic values of images taken in the vicinity of a route segment to compute the photogenic index of the route segment.

17. The method of claim 10, wherein the scene categories in step c) include "cities", "historical sites", "sports venues", "mountains", "beaches/oceans", "parks", and "local cuisine".

18. The method of claim 10, wherein using the computed photogenic indexes includes filtering route segments based on user input scene categories and then computing a photogenic route.

19. The method of claim 10, wherein using the computed photogenic indexes includes filtering route segments based on scene categories inferred from the user's photo collection and then computing a photogenic route.

20. A device configured to compute at least one photogenic route having one or more segments from a starting location to a destination location, wherein computing the at least one photogenic route comprises:

using a communication network to access diverse digital images stored on the Internet previously captured by a plurality of dissociated devices— at a plurality of different times in a geographic region, wherein the geographic region includes the starting location and destination location;

computing photogenic values for the accessed diverse images;

detecting scene categories for the accessed diverse images;

computing a photogenic index for each route segment based on the computed photogenic values of the accessed diverse images with respect to one or more of the scene categories corresponding to the route segment;

using the computed photogenic indexes to compute at least one preferred photogenic route from the starting location to the destination location and presenting the at least one preferred photogenic route and the corresponding route scene category distributions to a user-device.

* * * * *

UNITED STATES PATENT AND TRADEMARK OFFICE
CERTIFICATE OF CORRECTION

| | | |
|---|---|---|
| PATENT NO. | : 8,532,927 B2 | Page 1 of 1 |
| APPLICATION NO. | : 12/266863 | |
| DATED | : September 10, 2013 | |
| INVENTOR(S) | : Joshi et al. | |

It is certified that error appears in the above-identified patent and that said Letters Patent is hereby corrected as shown below:

In the Specifications

In Column 2, Line 58, delete "comprising;" and insert -- comprising: --, therefor.

In the Claims

In Column 9, Line 60, in Claim 1, delete "comprising;" and insert -- comprising: --, therefor.

In Column 10, Line 54, in Claim 10, delete "comprising;" and insert -- comprising: --, therefor.

Signed and Sealed this
First Day of April, 2014

Michelle K. Lee
*Deputy Director of the United States Patent and Trademark Office*